May 17, 1932. J. J. KOLAR 1,859,042

CHUCK

Filed Sept. 11, 1929

Inventor
John J. Kolar
By *Yanny Yanny*
Attorneys

Patented May 17, 1932

1,859,042

UNITED STATES PATENT OFFICE

JOHN J. KOLAR, OF WEST BEND, WISCONSIN

CHUCK

Application filed September 11, 1929. Serial No. 391,872.

This invention relates to new and useful improvements in chucks.

One of the objects of my invention is the provision of a clutch wherein the expansion and contraction of the jaws is equal throughout the full length of the jaws thereby providing equalized pressure on all points on the work being held by the jaws and thus the work is positively gripped throughout the extent of its surface and assuring a full gripping action.

Another object of my invention is the provision of a chuck wherein the jaws of the chuck are full-floating so that they are free to rotate inside of the chuck housing thereby distributing the wear uniformly in the chuck housing which will provide a continuous perfect alignment of the parts and increase the range of contraction of the jaws.

A further object of my invention is the provision of a chuck wherein the jaws are full-floating and means is incorporated in the construction of the chuck to create expansion of the jaws when moved outwardly from the chuck housing, the expansion being equal throughout the area of the jaws so as to assure a positive gripping of the chuck on the work.

With the above and other objects in view, the invention consists in the novel features of construction, the combination and arrangement of parts hereinafter more fully set forth, pointed out in the claims and shown in the accompanying drawings wherein:

Figure 1:
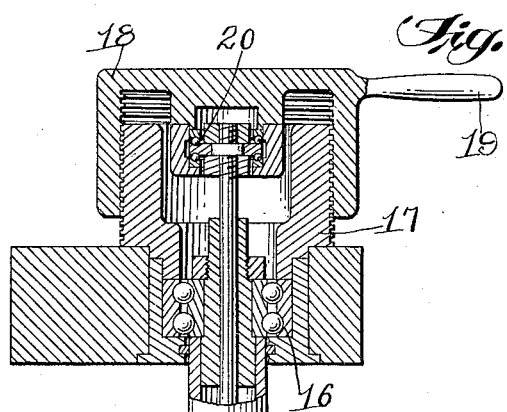
Figure 1 is a vertical sectional view of my improved chuck with parts thereof illustrated in elevation.
Figure 2:
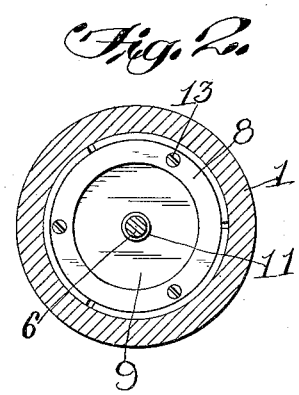
Figure 2 is a transverse section on the line 2—2 of Figure 1.
Figure 3:
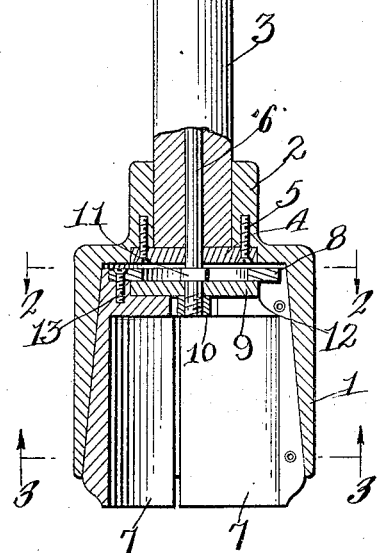
Figure 3 is a transverse section on the line 3—3 of Figure 1.
Figure 3:
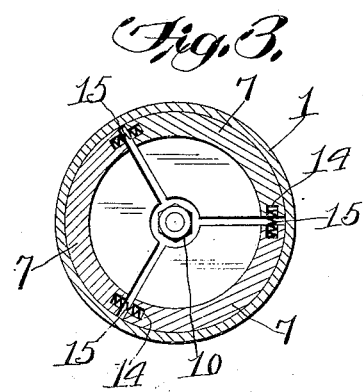

Referring more particularly to the drawings, 1 indicates a cylindrical chuck housing, the inner wall of which tapers downwardly from the inner end of the housing and the inner end of the housing has a sleeve 2 in which is fitted a driving shaft 3. On the end of the shaft is a plate 4 connected to the housing 1 by means of screw bolts 5. The plate 4 is perforated to receive the operating shaft or rod 6 for the jaws within the chuck housing. The plate 4 is fitted within a cut-away part formed in the inner end of the housing so that the outer surface of the plate will lie flush with the inner end of the housing.

Arranged within the housing 1 is the clutch member which comprises a plurality of gripping jaws 7. These jaws are arranged in circumferential relation within the housing 1 and their outer surfaces are tapered inwardly from the outer ends thereof, thus conforming with the inwardly tapering wall of the housing 1, whereby the outer surfaces of the jaws have a smooth even contact through their inner ends to their outer ends, thus assuring a positive even movement of the jaws in the housing.

The jaws 7 are connected to the rod 6 by means of an annular washer 8 and a plate 9. The plate 9 receives the inner threaded end of the rod 6 upon which a nut 10 is threaded, engaging one surface of the plate 9. The other surface of the plate is engaged by a collar 11 on the rod. This plate rests upon suitable shoulders 12 on the jaws 7 and is disposed beneath the inner edge of the washer 8, the washer 8 being arranged upon suitable shoulders at the inner ends of the jaws 7 and secured to the jaws by the screw bolts 13.

The adjacent edges of the jaws 7 are provided with bores 14 and arranged between the jaws with their ends disposed within the bores are the coil springs 15 which normally urge the jaws apart when they are moved outwardly from the housing 1.

From this, it will be apparent that when the jaws 7 are moved outwardly from the housing through the reciprocation of the rod 6 in one direction, the jaws will be moved apart for engaging the work and when they are moved inwardly they will be readily clamped onto the work and securely held thereto through the action of the tapering faces of the jaws on the tapering wall of the housing.

The shaft 3 has one end thereof mounted in a suitable bearing 16 and arranged above the bearing is a threaded collar 17 upon which is adjustably mounted a cap 18. This cap 18 has a handle 19 for rotating the same upon the collar 17 and is connected to the rod 6 at its central portion. The upper end of the rod being mounted in suitable roller bearings 20 so that it may rotate independently of the movement of the cap 18.

One of the particular advantages of my improved construction is the fact that the pressure on the jaws is equalized from one end of the jaws to the other, and, therefore, any work positioned between the jaws and extended inwardly to the inner ends thereof will be securely gripped along the entire length of the jaws and the frictional contact of the jaws within the housing 1 will assure positive contact of the jaws with the work throughout the entire surface of the jaws.

I claim:

1. A chuck comprising a supporting shaft having an axial bore, a chuck housing having a sleeve at one end receiving the shaft, the housing being opened at one end and having its inner wall flared outwardly toward said opened end, a plurality of segmental jaws received in the housing each independent of the other, an adjusting rod slidably mounted in the bore, a plate carried by the inner end of the rod, and means connecting the independent jaws to the plate, each of the jaws being freely movable of the other jaws and all of the jaws being movable around the plate.

2. In a device for operating an expanding chuck, a rotatable operating shaft having an axial bore extending therefrom, an adjusting rod for the chuck slidable in the bore, a bearing bracket, means rotatably mounting the shaft in the bearing bracket, an externally threaded collar rigidly connected with the bearing bracket receiving the rear end of the adjusting rod, an adjustable cap threaded on the sleeve and movable toward and away from the bearing bracket, a plate carried by the rear end of the adjusting rod and anti-friction bearings carried by the adjustable cap engaging the opposite sides of the plate.

In testimony that I claim the foregoing I have hereunto set my hand at West Bend, in the county of Washington, and State of Wisconsin.

JOHN J. KOLAR.